US012695511B2

(12) United States Patent
Corcoran et al.

(10) Patent No.: US 12,695,511 B2
(45) Date of Patent: Jul. 28, 2026

(54) DATA TRANSMISSION RATES FROM OPTICAL SOURCES

(71) Applicant: MONASH UNIVERSITY, Clayton (AU)

(72) Inventors: William Peter Corcoran, Clayton (AU); Andreas Stefan Boes, Melbourne (AU); Xingyuan Xu, Clayton (AU); Mengxi Tan, Hawthorn (AU); Chawaphon Prayoonyong, Clayton (AU); Arnan Deane Mitchell, Melbourne (AU); David James Moss, Hawthorn (AU)

(73) Assignee: Monash University, Clayton (AU)

( * ) Notice: Subject to any disclaimer, the term of this patent is extended or adjusted under 35 U.S.C. 154(b) by 311 days.

(21) Appl. No.: 18/268,845

(22) PCT Filed: Dec. 17, 2021

(86) PCT No.: PCT/AU2021/051506
§ 371 (c)(1),
(2) Date: Jun. 21, 2023

(87) PCT Pub. No.: WO2022/133517
PCT Pub. Date: Jun. 30, 2022

(65) Prior Publication Data
US 2024/0048243 A1 Feb. 8, 2024

(30) Foreign Application Priority Data
Dec. 21, 2020 (AU) ................................ 2020904762

(51) Int. Cl.
*H04B 10/50* (2013.01)
*H04B 10/516* (2013.01)
(Continued)

(52) U.S. Cl.
CPC ....... *H04B 10/503* (2013.01); *H04B 10/5165* (2013.01); *H04B 10/61* (2013.01); *H04J 14/0298* (2013.01)

(58) Field of Classification Search
CPC .......................... H04B 10/516; H04B 10/5165
See application file for complete search history.

(56) References Cited

U.S. PATENT DOCUMENTS

2002/0181052 A1    12/2002  Butman et al.
2008/0285606 A1*   11/2008  Kippenberg .............. G02F 1/39
                                                            372/32
(Continued)

OTHER PUBLICATIONS

Australian Patent Office, International Search Report of PCT/AU2021/051506, 3 sheets, mailed Feb. 28, 2022.
(Continued)

*Primary Examiner* — Nathan M Cors
(74) *Attorney, Agent, or Firm* — Leydig, Voit & Mayer, Ltd.

(57) ABSTRACT

Apparatus including an optical signal generator, a data transmission path, and an optical signal receiver. Optical signal generator includes a coherent light source for generating a spectrum of carrier signals at different carrier frequencies, an optical demultiplexer that receives and separates the different carrier signals into separate optical paths, a pair of optical modulators located in each of the separate optical paths to modulate each different carrier signal with a data signal and produce an upper and lower sideband pair at each of the different carrier frequencies, and an optical interleaver to combine the upper and lower sideband pairs into an optical super-channel of interleaved sub-bands. Optical signal receiver includes a demodulator for extracting the data signals. Optical modulators are configured to reuse each carrier signal to transmit different data in each of the upper
(Continued)

sideband and the lower sideband and increase the capacity of the super-channel. Also a method.

18 Claims, 6 Drawing Sheets

(51) Int. Cl.
*H04B 10/61* (2013.01)
*H04J 14/02* (2006.01)

(56) References Cited

U.S. PATENT DOCUMENTS

| | | | |
|---|---|---|---|
| 2014/0133860 A1 | 5/2014 | Olsson et al. | |
| 2015/0010307 A1 | 1/2015 | Zhong et al. | |
| 2016/0208603 A1* | 7/2016 | Barfoot | E21B 47/135 |
| 2018/0115136 A1* | 4/2018 | Delfyett | H01S 3/1062 |
| 2019/0278155 A1* | 9/2019 | Plascak | G02F 1/353 |
| 2020/0064512 A1* | 2/2020 | Stark | G02F 1/365 |
| 2021/0096444 A1* | 4/2021 | Zhang | G02F 1/3536 |
| 2021/0266063 A1* | 8/2021 | Fermann | H04J 14/0227 |

OTHER PUBLICATIONS

Corcoran et al., "Ultra-dense optical data transmission over standard fibre with a single chip source," *Nature Communications*, vol. 11; 7 pages (2020).
Wang et al., "Advances in soliton microcomb generation," *Advanced Photonics*, 2(3): 27 pages (2020).
Xue et al., "Programmable Single-Bandpass Photonic RF Filter Based on Kerr Comb from a Microring," *Journal of Lightwave Technology*, 32(20): 3557-3565 (2014).

* cited by examiner

40

42

44

46

DATA TRANSMISSION RATES FROM OPTICAL SOURCES

FIELD OF THE INVENTION

The present invention relates generally to apparatus and methods for improving data rates in fibre-optical networks, and in particular methods and apparatus involving the use of optical super channels to provide a route to obtaining the highest achievable data rates in such fibre optic networks.

BACKGROUND

Fibre-optical networks are now a crucial part of telecommunication infrastructure. The global optical fibre network currently carries hundreds of terabytes per second every instance, with capacity growing at approximately 25% annually. The telecommunications industry is always looking for increasingly compact, low cost and energy sufficient solutions to increase bandwidth for the customers without investing heavily in new infrastructure.

Around a decade ago, coherent optical transmission at 40 gigabytes per second and 100 gigabytes per second began to be deployed in long optical networks around the world. Coherent technology enables high data rates to be sent over long-haul optical transmission networks. However, a coherent detector requires that the incoming optical signal information is digitised before being sent to a high-performance digital signal processor. Within the digital signal processor, optical impairments such as chromatic dispersion and polarisation mode dispersion can be compensated for. Digitising the received signal requires an extremely high speed to analogue to digital convertor capability.

Going to 1 terabytes per second and beyond, Wave Division Multiplexing (WDM) channel requires the use of multiple carriers to make up a single WDM interface. The resulting multiplexing, called a super-channel, creates a multiple wavelength signal in which each wavelength will operate at the maximum data rate permitted by commercially available analogue to digital convertor components. The primary advantages of a super-channel approach are increased spectral efficiency and operational saleability.

Nevertheless, there exists a need to continue to improve data transmission rates of fibre optical networks in an efficient and in-expensive manner.

There also exists a need to provide a fibre-optical network that ameliorates or overcomes one or more problems of existing fibre-optical networks.

SUMMARY OF THE INVENTION

According to a first aspect of the present invention, there is provided an apparatus including:
an optical signal generator, including
    a coherent light source for generating a spectrum of carrier signals at different carrier frequencies;
    an optical demultiplexer that receives and separates the different carrier signals into separate optical paths, respectively;
    a pair of optical modulators respectively located in each of the separate optical paths to respectively modulate each different carrier signal with a data signal and produce an upper and lower sideband pair at each of the different carrier frequencies; and an optical interleaver to combine the upper and lower sideband pairs into an optical super-channel of interleaved sub-bands, a data transmission path for receiving and transmitting the super-channel; and
an optical signal receiver, including
    a demodulator for extracting the data signals from the sub-bands, wherein each pair of optical modulators is configured to re-use each carrier signal to transmit different data in each of the upper sideband and the lower sideband and thereby increase the capacity of the super-channel.

Preferably, the coherent light source includes: a single laser that produces a continuous wave laser beam at a laser frequency; and a micro-ring resonator that receives the laser beam from the single laser, the single laser being tuned to the micro-ring resonator to generate a micro-comb spectrum of carrier signals at different carrier frequencies.

The apparatus may further comprise an optical filter between the data transmission path and the demodulator to selectively filter the upper sideband or the lower sideband of each carrier signal to a separate coherent detection stage.

The sub-bands each have a bandwidth, and the optical filter may have a passband greater than or equal to sub-band bandwidth.

Preferably, the optical filter has a passband equal to sub-band bandwidth.

The optical filter may have a passband less than 3 times the sub-band bandwidth.

The optical filter has a roll-off greater than 20 dB at less than 1% of the sub-band bandwidth.

The optical interleaver spaces the interleaved sub-bands at intervals equal to twice the sub-band bandwidth.

According to a second aspect of the present invention, there is provided a method including:
at an optical signal generator,
    generating a spectrum of carrier signals at different carrier frequencies from a coherent light source
    receiving and separating the different carrier signals into separate optical paths at an optical demultiplexer, respectively;
    at a pair of optical modulators respectively located in each of the separate optical paths, respectively modulating each different carrier signals with a data signal and produce an upper sideband and a lower sideband at each of the different carrier frequencies; and
    at an optical multiplexer, combining the modulated carrier signals into an optical super-channel of interleaved sub-bands,
receiving and transmitting the optical super-channel along a data transmission path; and
at optical signal receiver,
    extracting the data signals from the sub-bands at a demodulator,
wherein each pair of optical modulators are configured to re-use each carrier signal to transmit different data in each of the upper sideband and the lower sideband and thereby increase the capacity of the super-channel.

The step of generating a spectrum of carrier signals may include:
producing a continuous wave laser beam at a laser frequency; and
receiving a laser beam from the single laser at a micro-ring resonator, the single laser being tuned to the micro-ring resonator to generate a micro-comb spectrum of carrier signals at different carrier frequencies.

The method may further comprise:
at an optical filter between the data transmission path and the demodulator, selectively filtering the upper sideband or the lower sideband of each carrier signal to a separate coherent detection stage.

According to a third aspect of the present invention, there is provided an optical signal generator including:

a coherent light source for generating a spectrum of carrier signals at different carrier frequencies; an optical demultiplexer that receives and separates the different carrier signals into separate optical paths, respectively;

a pair of optical modulators respectively located in each of the separate optical paths to respectively modulate each different carrier signal with a data signal and produce an upper and lower sideband pair at each of the different carrier frequencies; and an optical interleaver to combine the upper and lower sideband pairs into an optical super-channel of interleaved sub-bands, wherein each pair of optical modulators is configured to re-use each carrier signal to transmit different data in each of the upper sideband and the lower sideband and thereby increase the capacity of the super-channel.

BRIEF DESCRIPTION OF THE DRAWINGS

The invention will now be described in further detail by reference to the accompanying drawings. It is to be understood that the particularity of the drawings does not supersede the generality of the preceding description of the invention.

DETAILED DESCRIPTION

Figure 1:
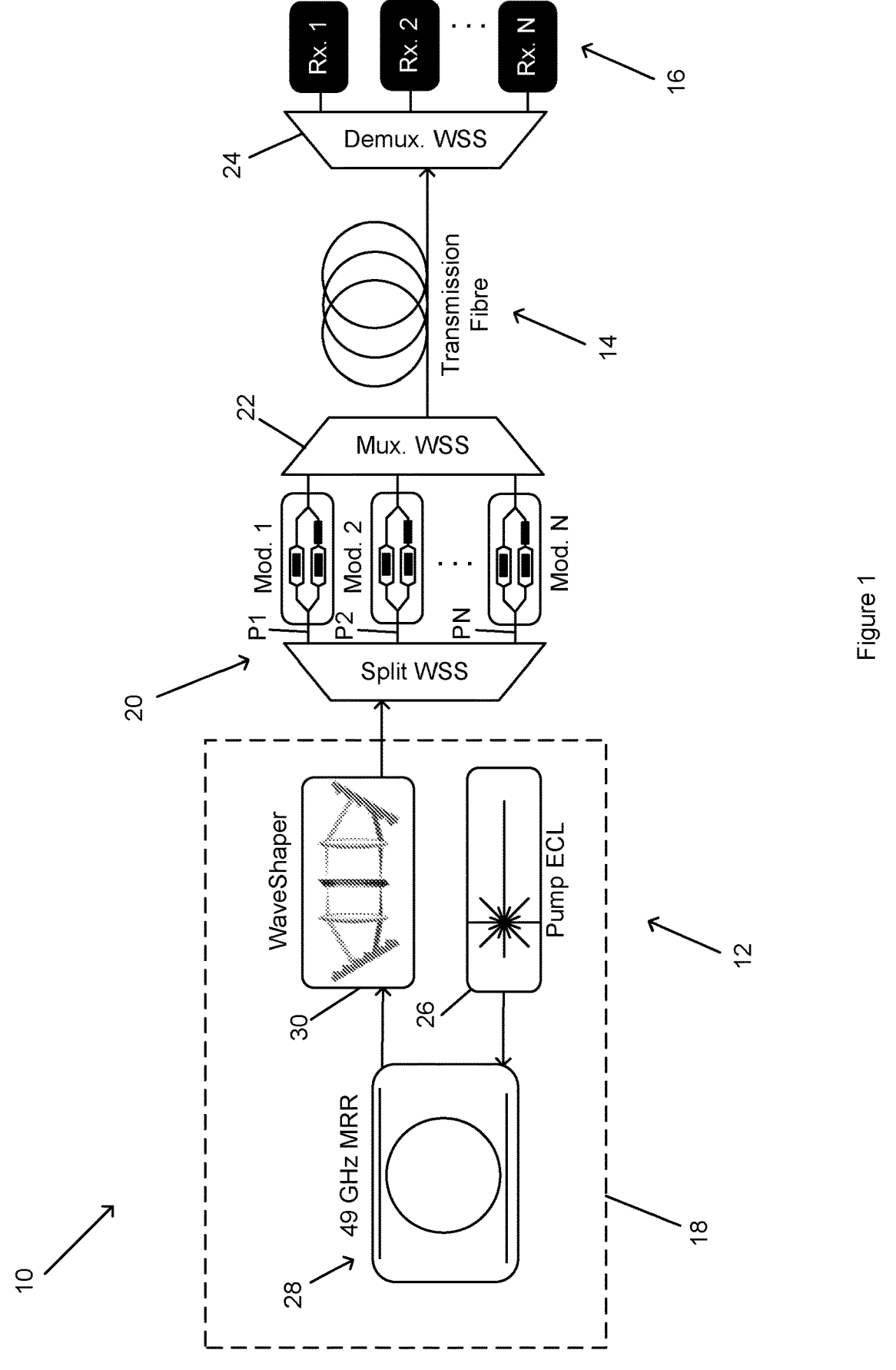
FIG. 1 is a schematic diagram of an apparatus for generating, transmitting and receiving optical signals according to one embodiment of the invention.

Referring firstly to FIG. 1, there is shown generally an apparatus 10, including an optical signal generator 12, a data transmission path 14, and an optical signal receiver 16.

The optical signal generator 12 includes a coherent light source 18 for generating a spectrum of carrier signals at different carrier frequencies, and an optical de-multiplexer 20, that receives and separates the different carrier signals into separate optical paths, respectively. The optical signal generator 12 also includes a pair (Mod.1, Mod.2 . . . Mod.N) of optical modulators respectively located in each of the separate optical paths to respectively modulate each different carrier signal with a data signal and produce an upper and lower sideband pair at the different carrier frequencies.

An optical interleaver 22, then acts to combine the upper and lower sideband pairs into an optical super-channel of interleaved sub-bands. The optical super-channel is transmitted over the data transmission path 14 and received by the optical signal receiver 16. The optical signal 16, includes a demultiplexer 24, for extracting the sub-bands from the super-channel for further analysis at receivers Rx1, Rx2 . . . RxN.

In the example depicted in FIG. 1, the coherent light source 18 includes a single laser 26 that produces a continuous wave laser beam at a laser frequency, as well as a micro-ring resonator 28, that receives the laser beam from the signal laser 26. The single laser is tuned to the micro-ring resonator to generate a micro-comb spectrum of carrier signals at different carrier frequencies. The coherent light source 18 further includes an tailored optical filter 30 which acts to flatten the micro-comb spectrum of carrier signals from the micro-ring resonator 28.

In other embodiments of the invention, the coherent light source 18 may employ different means for generating a spectrum of carrier signals at different carrier frequencies. For example, a coherent light source employing multiple independent lasers may be used. In embodiments in which an optical frequency comb is employed, a number of different alternatives can be envisaged. Firstly, a frequency comb derived from a single laser and multiple electro-modulators may be used. Alternatively, a frequency comb derived from a phase-stabled pulsed laser may be employed. Yet again, a frequency comb derived from multiple independent sources locked to an optical resonator may be used.

Figure 2:
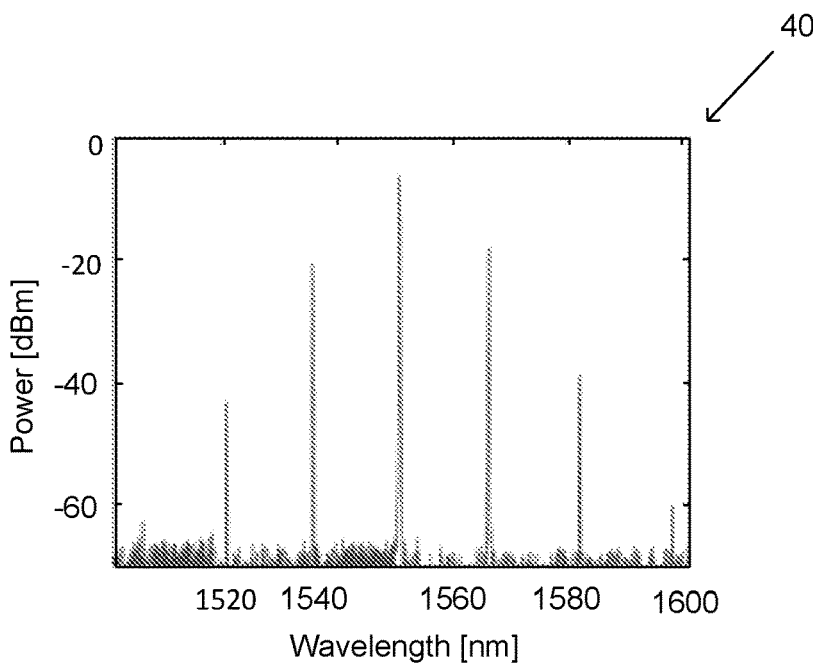
FIG. 2 shows a spectrum of primary comb states generated by a micro-comb forming part of the apparatus shown in FIG. 1.

As shown in the spectrum 40 of FIG. 2, when in use, a primary comb is initially generated as the laser 26 is tuned into resonance with the micro-ring resonator. At a pre-set wavelength, a soliton crystal forms, with spectral features based around the primary comb lines, as shown by the spectrum 42 in FIG. 3. After flattening by the tailored optical filter 30, a spectrum 44 shown in FIG. 4 is generated.

Figure 5:
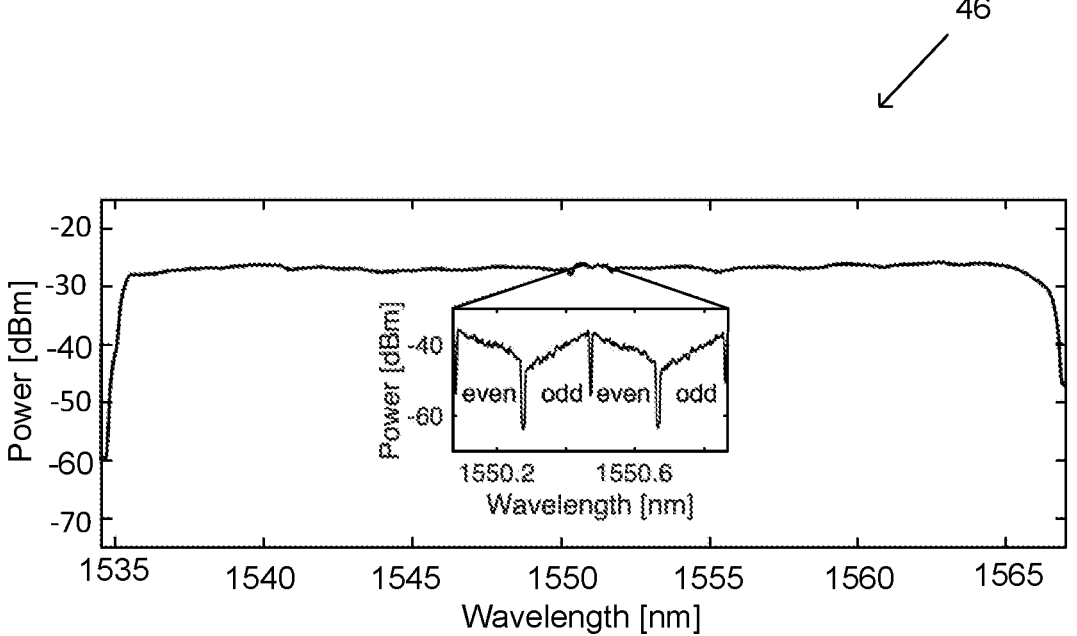
FIG. 5 shows the partial spectrum shown in FIG. 4 after modulation and transmission by the apparatus shown in FIG. 1, and notably depicting odd and even sub-bands modulated onto exemplary comb lines.

FIG. 5 depicts a spectrum 46 after modulation and transmission via the data transmission path 14. This spectrum includes an inset 48 depicting channel spectra and highlighting odd and even sub-bands 50 to 56 forming the optical super-channel. Significantly, each pair p1, p2 . . . pN of optical modulators is configured to reuse each carrier signal to transmit different data in each of the upper side band and the lower side band to thereby increase the capacity of the super-channel.

Figure 3:
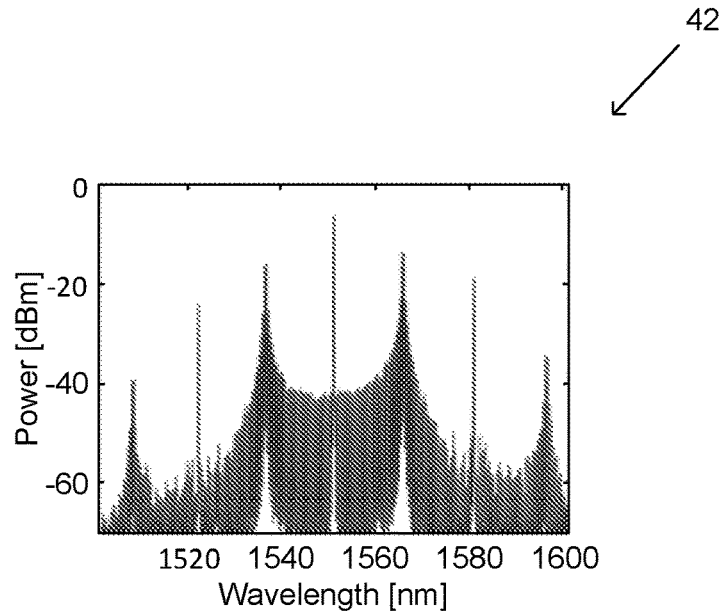
FIG. 3 shows a spectrum of soliton crystal states generated by a micro-comb forming part of the apparatus shown in FIG. 1.
Figure 4:
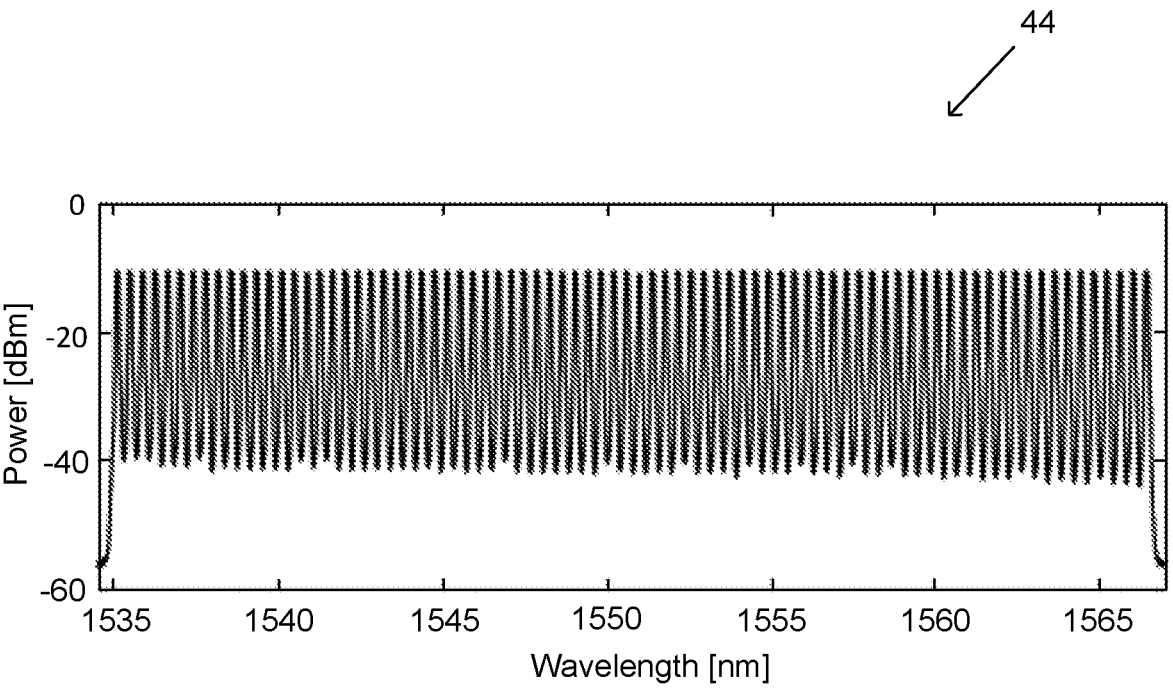
FIG. 4 shows part of the spectrum shown in FIG. 2 after flattening by the apparatus shown in FIG. 1 prior to data transmission.

In an experimental configuration, from a generated micro-comb, 80 lines were selected over the telecommunications C-band shown in the waveform 40 on FIG. 2 and the waveform 42 on FIG. 3 (32 nm wide, 3.95 THz window from 1536 to 1567 nm), which were then flattered with the tailored optical filter 30. Next, the number of wavelengths were effectively doubled to 160 (equivalent to a cone spacing of 24.5 GHz) to optimise the spectral efficiency (spectrally useful content) by using a single-sideband modulation scheme to generate the odd/even decorrelated test channels, such as those referenced 50 to 56 in FIG. 5.

Contrary to prevailing views, the inventors have found that micro-combs with a lower Free Spectral Range (FSR) enable a high spectral efficiency, which can also improve a single-device data rate, that is, if an individual data band occupies a smaller bandwidth on a micro-comb, the overall device rate can be surprisingly much higher.

Prevailing opinion is that this should make no difference to the achievable data rate, since a larger bandwidth gives a larger data rate. The inventors have found that to the contrary, a bandwidth may be divided into smaller slices provided by separate modulators, and then densely compacted into super channels and in so doing can enable high overall data transmission rates.

Table 1 below summarises key results from prior art literature comparing various system performance metrics based on a single integrated source and over standard fibre (or calculated on a per-mode basis for multicore fibre) to results achieved for embodiments of the present invention. Previously, the best result (per core) was based on single micro-comb that was able to support 30.1 Tb/s over the C and L bands, when using a standard tuneable laser coherent receiver.

laser cavity-soliton micro-combs may provide a powerful path to improve signal quality and system capacity even further.

Embodiments of the invention provide high-performance ultrahigh band-width optical transmission from a single integrated chip source by using soliton crystal micro-combs. This achievement is a result of the low comb spacing combined with the stable, efficient, and broad bandwidth of the soliton crystal combs, all enabled by their CMOS-compatible integration platform. Soliton crystal micro-combs are intrinsically coherent, low noise, and can be initialised and maintained using standard open-loop control with off-the-shelf equipment. This work demonstrates their ability to support ultrahigh bandwidth data transmission in practical and demanding environments.

Figure 6:
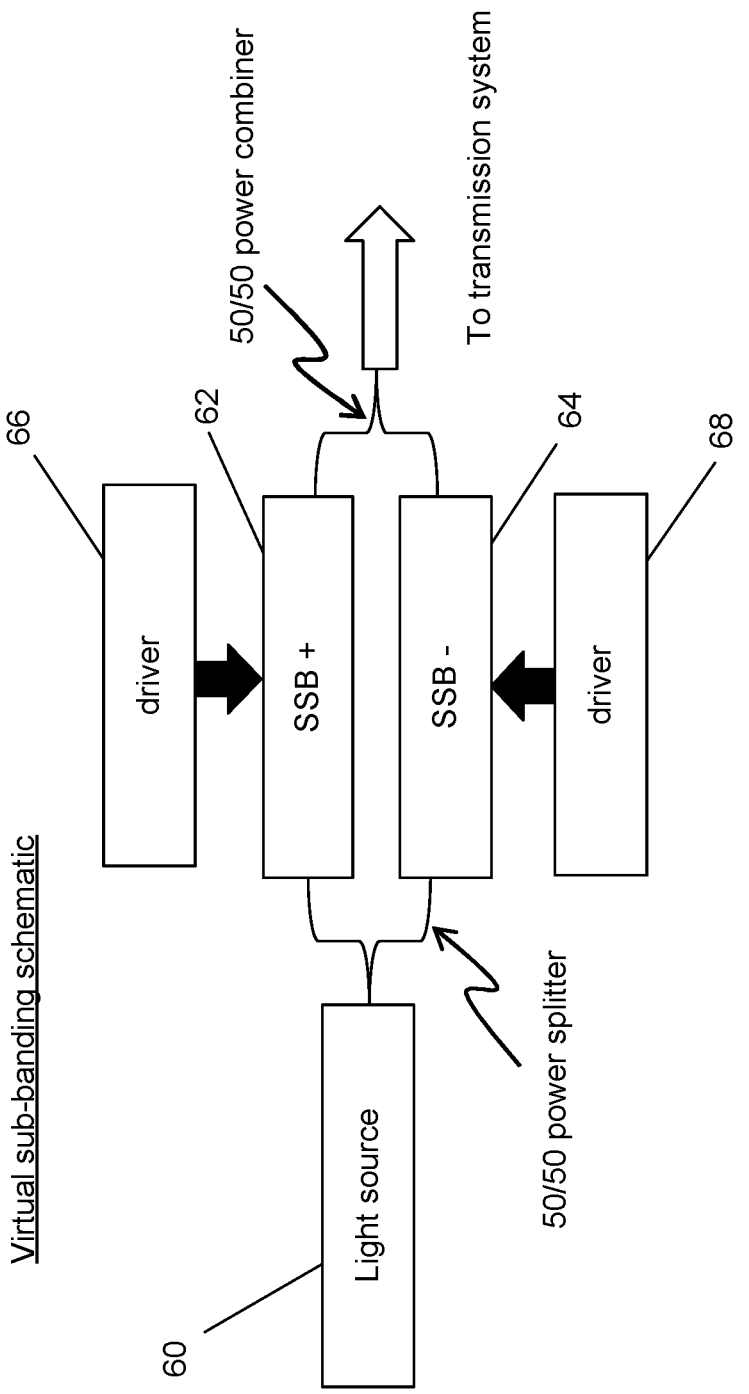
FIG. 6 is a schematic diagram of an optical signal receiver forming part of the apparatus shown in FIG. 1.

FIG. 6 depicts functions carried out by the optical signal generator 30 shown in FIG. 1, in order to explain the virtual sub-band scheme implemented by the apparatus 10. In FIG. 6, a light source 60 generates a spectrum of carrier signals at different frequency carriers. Single sideband modulation 62 and 64 is applied by the pair of optical modulators pair p1, p2 . . . pN to respectively modulate each carrier signal

TABLE 1

Key systems performance metrics.

| Line rate | Net rate | Format | Spectral efficiency | Transmission | Source |
|---|---|---|---|---|---|
| 30.1 Tb/s | 28.0 Tb/s | 16 QAM | 2.8 b/s/Hz | 75 km SMF in-lab | Prior art |
| 4.8 Tb/s* | 4.4 Tb/s | 64 QAM | 1.1 b/s/Hz* | 80 km SMF in-lab | Prior art |
| 25.6 Tb/s[1] | 22.0 Tb/s[1] | 16 QAM | 3.2 b/s/Hz[1] | 9.6 km, 30-core fibre[1] | Prior art |
| 44.2 Tb/s | 40.1 Tb/s | 64 QAM | 10.4 b/s/Hz | B2B (0 km) | Present invention |
| 44.2 Tb/s | 39.2 Tb/s | 64 QAM | 10.2 b/s/Hz | 75 km SMF in-lab | Present invention |
| 44.2 Tb/s | 39.0 Tb/s | 64 QAM | 10.1 b/s/Hz | 76.6 km SMF installed | Present invention |

The results achieved for embodiments of the present invention shown in FIG. 1 use less than half the spectrum of prior art systems, whereas embodiments of the present invention substantially exceeding that data rate, owing to a much higher spectral efficiently (3.7× higher). Although the experiments on embodiments of the present invention were restricted to the C-band shown in FIGS. 2 and 3, the soliton crystal comb had a bandwidth exceeding 80 nm. The comb lines in the S and L bands (1500-1535 nm and 1565-1605 nm) could in principle be increased in power to enable transmission across all three bands, by varying the pump wavelength and power, tailoring dispersion, and/or by other methods. Assuming similar comb quality, this would result in a threefold increase in total data rate to 120 Tb/s from a single integrated device.

Micro-combs with lower FSRs would support even higher spectral efficiencies since the signal quality improves at lower symbol rates. However, this may come at the expense of a narrower overall comb bandwidth. In the experiments documented in Table 1, single sideband modulation enabled the multiplexing of two channels onto a single light source, effectively halving the comb spacing while improving back-to-back performance as limited by transceiver noise. This approach was made feasible by the stable nature of the soliton crystal combs.

On the other hand, electro-optic modulation can also be used to sub-divide the repetition rate of micro-combs, which would enable broad comb-bandwidths. Although this would require locking the comb spacing to an external RF source, sub-MHz stabilisation of comb spacings has been reported. Further, boosting the comb generation efficiency through with a data signal respectively from drivers 66 and 68 in order to produce a upper and lower side band pair at each different carrier frequency. These upper and lower side band pairs are then sent to transmission system.

Figures 7, 8:
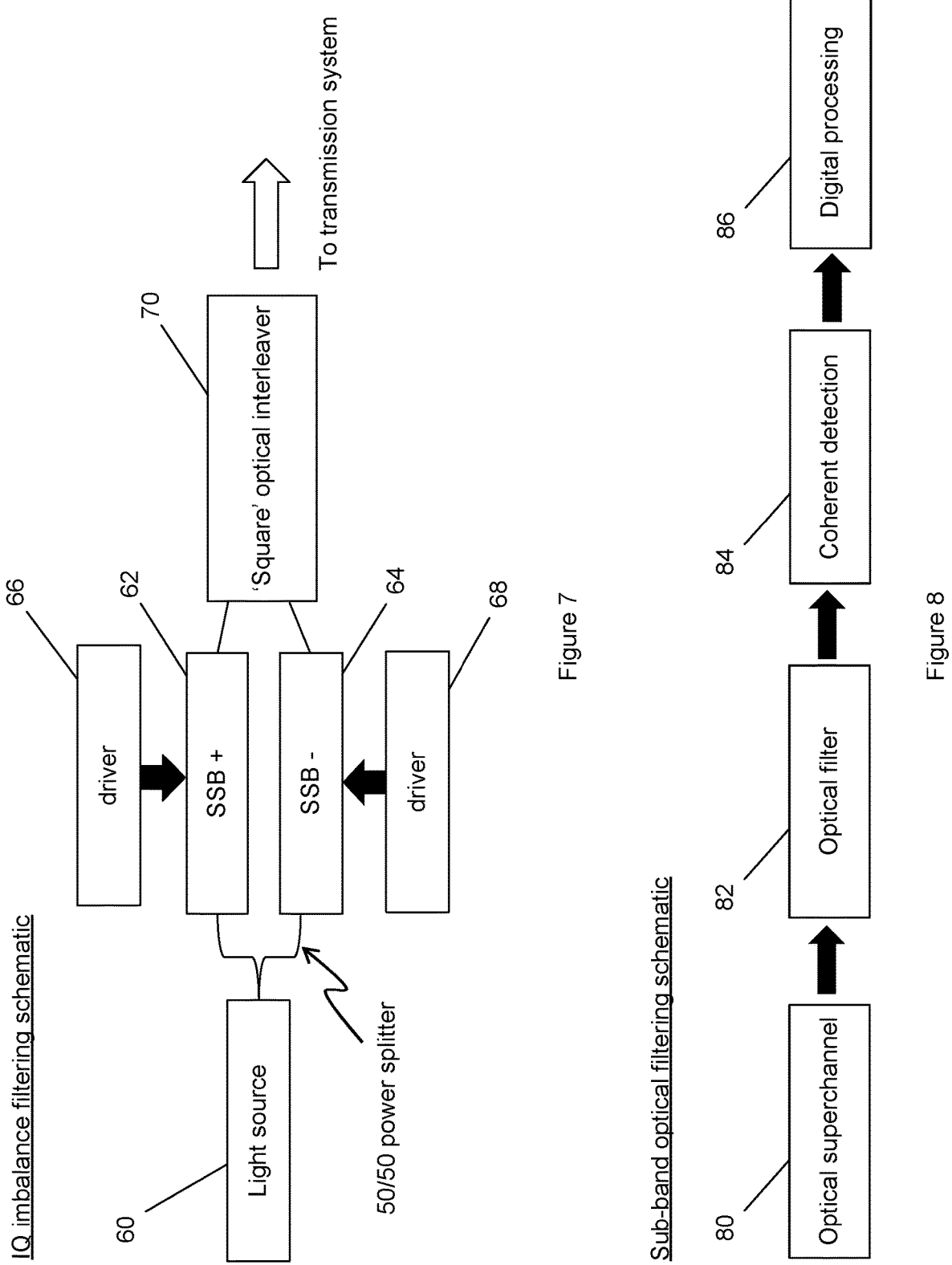
FIG. 7 is a schematic diagram of an alternative to the optical signal receiver forming part of the apparatus shown in FIG. 6.
FIG. 8 is a schematic diagram of an optical signal receiver forming part of the apparatus shown in FIG. 1.

As depicted in FIG. 7, prior to sending the upper and lower sideband pairs for transmission, an optical interleaver combines the upper and lower sideband pairs into a optical super-channel of interleaved sub-bands. In some embodiments, the interleaver may be used to enhance the band-limiting functionality of a commercial wavelength selective switch. In other embodiments, the interleaver can do the combination without the use of a wavelength selective switch. Preferably, the optical interleaver spaces the interleaved sub-bands at intervals equal to twice the sub-band bandwidth. Such a "square" interleaver device acts to remove I/Q imbalance interference from the non-data side of the spectrum to improve the spectral efficiency of the apparatus 10.

Ideally, the filter function should roll off to less than minus 20 dB when crossing over to a neighbouring sub-band. A lower roll off is acceptable but will reduce I/Q imbalance interference cancellation proportional to the amount of interference power passed. The interleaver 70, ideally has a 3 dB crossover point and so a guide band equal to the roll-off of the filter (in % of the interleaver spacing) is preferred to limit filtering penalty whilst optimising spectral utilisation. The attenuation across the adjacent sub-band attenuation should be less than −20 dB with a lower attenuation reducing I/Q imbalance interference cancellation.

Referring now to FIG. 8, there is shown an optical super-channel 80 that is transmitted on a data transmission path and then, at the optical signal receiver 16, filtered by an optical filter 82 and, at the demultiplexer 24, able to perform coherent detection 84, so as to extract any phase and amplitude information carried in the transmitted sub-bands. This extracted information is then processed in a digital processing unit 86.

The optical filter 82 acts to selectively transmit the upper side band or the lower side band of each carrier signal. Preferably, the optical filter has a passband greater than or equal to the sub-band bandwidth. Even more preferably, the optical filter as a passband equal to the sub-band bandwidth. Ideally, the roll-off of the optical filter is greater than 20 dB at less than 1% of the sub-band bandwidth. The roll-off and the passband of the optical filter 82 is set to enable a significant reduction of neighbouring sub-band power. Ideally, this means that the optical filter 82 has a narrower bandwidth than the coherent detection stage 84, and/or a sharper roll off than the coherent detection stage 84. A filter wider than this sub-band can be used, but should ideally be less than 3 times the sub-band bandwidth. As filter bandwidth increases beyond the sub-band bandwidth, performance as been found to improve with a faster roll off.

Figure 9:
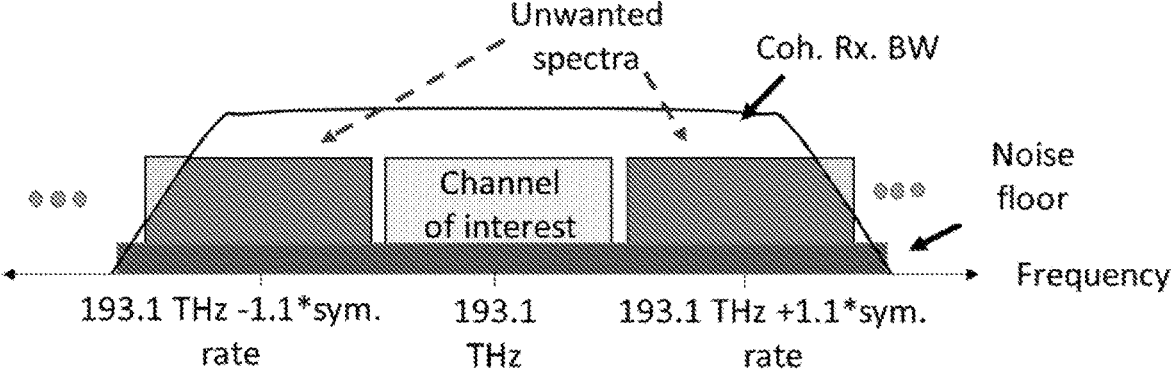
FIG. 9 shows a spectrum of transmitted signals illustrating closely spaced neighbouring channels filtered by a coherent receiver forming part of the optical signal receiver shown in FIG. 8.
Figure 10:
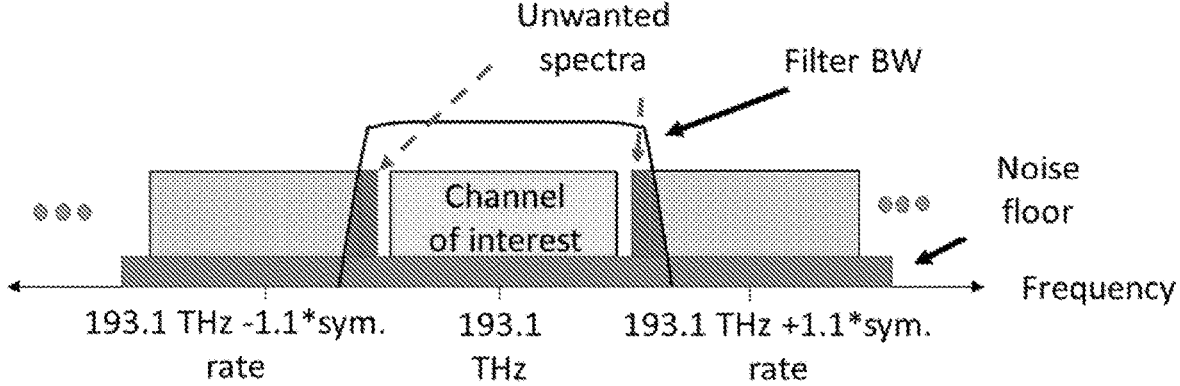
FIG. 10 shows a spectrum of transmitted signals illustrating closely spaced neighbouring channels filtered by an optical filter forming part of the optical signal receiver shown in FIG. 8.

To improve the reception of optical super-channels, optical filtering may be applied. FIG. 9 illustrates that in a system with a limited received power and without optical filtering, per-channel power for the sub-band of interest is reduced by splitting the total power between multiple sub-bands. However, once optical filtering is applied to remove neighbouring sub-bands, the ratio of the received power of the sub-band of interest to total power increases as illustrated in FIG. 10. As a result, optical filtering may enable higher achievable SNRs and, thus, better performance.

Moreover, improvement from optical filtering may also depend on different modulation formats due to the fact that different schemes require different levels of dynamic range and the Euclidean distance between each constellation point changes. This is particularly important if higher modulation formats are employed, and power for the channel of interest is limited.

Although optical filtering can maximize power of the channel of interest to overcome the transceiver noise, after a super-channel propagates over long distances, in-band optical noise added by amplifiers grows and overwhelms transceiver noise. Optical filtering is useful in super-channel reception in shorter-reach systems where the number of amplifiers is limited. This is particularly relevant to metro-area systems, where required capacity is growing at a rapid rate.

Further advantages of embodiments of the invention include:
- compatibility with existing optical fibre infrastructure and COTS equipment;
- capability of leveraging powerful photonic integration technology;
- increasing achievable data rates without requiring new fibre roll-outs.

In order to have ultra-high data rates, signals sent and received must be extremely precise and minimise noise. Counter-intuitively, embodiments of the invention reduce the bandwidth of signals in a system can improve the overall data rate. This is in contrast to the standard approach of increasing signal bandwidth to increase data rates.

By sharing light from a single source with multiple optical modulators, modulated signals are spread the over lower noise bandwidth, improving signal quality. Combined with optical filtering, this ensures that transmitter and receiver fibre optic communication systems can reach ultra-high data rates While the invention has been described in conjunction with a limited number of embodiments, it will be appreciated by those skilled in the art that many alternative, modifications and variations in light of the foregoing description are possible. Accordingly, the present invention is intended to embrace all such alternative, modifications and variations as may fall within the spirit and scope of the invention as disclosed.

The invention claimed is:

1. A communication system, the communication system comprising:
an optical signal generator, including:
a coherent light source comprising a single laser that produces a continuous wave laser beam at a laser frequency and a micro-ring resonator that receives the laser beam from the single laser, the single laser being tuned to the micro-ring resonator to generate a micro-comb spectrum of different carrier signals at different carrier frequencies;
an optical demultiplexer that receives and separates the different carrier signals into separate optical paths, respectively;
a pair of optical modulators respectively located in each separate optical path to respectively modulate an upper sideband and a lower sideband of each different carrier signal with respective data signals and produce a modulated upper and lower sideband pair at each of the different carrier frequencies; and
an optical interleaver to combine the modulated upper and lower sideband pairs into an optical super-channel of interleaved sub-bands;
a data transmission path for receiving and transmitting the super-channel; and
a coherent optical signal receiver, including a demodulator for extracting data signals from the interleaved sub-bands of the optical super-channel;
wherein each pair of optical modulators is configured to use each carrier signal to transmit different data in each of the upper sideband and the lower sideband and thereby increase a capacity of the optical super-channel.

2. The communication system according to claim 1, further comprising:
an optical filter between the data transmission path and the demodulator to selectively filter the upper sideband or the lower sideband of each carrier signal to a separate coherent detection stage.

3. The communication system according to claim 2, wherein each of the interleaved sub-bands has a sub-band bandwidth, and the optical filter has a passband greater than or equal to the sub-band bandwidth.

4. The communication system according to claim 3, wherein the passband of the optical filter is equal to the sub-band bandwidth.

5. The communication system according to claim 3, wherein the passband of the optical filter is less than 3 times the sub-band bandwidth.

6. The communication system according to claim 3, wherein the optical filter has a roll-off greater than 20 dB at less than 1% of the sub-band bandwidth.

7. The communication system according to claim 3, wherein the optical interleaver spaces the interleaved sub-bands at intervals equal to twice the sub-band bandwidth.

8. The communication system according to claim 1, wherein the data transmission path includes an optical fibre link.

9. A method, comprising:

at an optical signal generator, producing, by a single laser, a continuous wave laser beam at a laser frequency;

receiving a laser beam from the single laser at a micro-ring resonator, the single laser being tuned to the micro-ring resonator to generate a micro-comb spectrum of different carrier signals at different carrier frequencies;

receiving and separating the different carrier signals into separate optical paths at an optical demultiplexer, respectively;

at a pair of optical modulators respectively located in each separate optical path, respectively modulating an upper sideband and a lower sideband of each different carrier signal with respective data signals and producing a modulated upper and lower sideband pair at each of the different carrier frequencies; and at an optical multiplexer, combining the modulated upper and lower sideband pairs into an optical super-channel of interleaved sub-bands, transmitting the optical super-channel along a data transmission path; and at a coherent optical signal receiver, receiving the optical super-channel along the data transmission path; and extracting data signals from the interleaved sub-bands of the optical super-channel at a demodulator;

wherein each pair of optical modulators are configured to use each carrier signal to transmit different data in each of the upper sideband and the lower sideband and thereby increase a capacity of the optical super-channel.

10. The method according to claim 9, and further comprising:

at an optical filter between the data transmission path and the demodulator, selectively filtering the upper sideband or the lower sideband of each carrier signal to a separate coherent detection stage.

11. The method according to claim 10, wherein each of the interleaved sub-bands has a sub-band bandwidth, and the optical filter has a passband greater than or equal to the sub-band bandwidth.

12. The method according to claim 11, wherein the passband of the optical filter is equal to sub-band bandwidth.

13. The method according to claim 11, wherein the passband of the optical filter is less than 3 times the sub-band bandwidth.

14. The method according to claim 11, wherein the optical filter has a roll-off greater than 20 dB at less than 1% of the sub-band bandwidth.

15. The method according to claim 11, wherein:

the optical interleaver spaces the interleaved sub-bands at intervals equal to twice the sub-band bandwidth.

16. The method according to claim 9, wherein the data transmission path includes an optical fibre link.

17. An optical signal generator, comprising:

a coherent light source comprising a single laser that produces a continuous wave laser beam at a laser frequency and a micro-ring resonator that receives the laser beam from the single laser, the single laser being tuned to the micro-ring resonator to generate a micro-comb spectrum of different carrier signals at different carrier frequencies;

an optical demultiplexer that receives and separates the different carrier signals into separate optical paths, respectively;

a pair of optical modulators respectively located in each separate optical path to respectively modulate an upper sideband and a lower sideband of each different carrier signal with respective data signals and produce a modulated upper and lower sideband pair at each of the different carrier frequencies; and an optical interleaver to combine the modulated upper and lower sideband pairs into an optical super-channel of interleaved sub-bands;

wherein each pair of optical modulators is configured to use each carrier signal to transmit different data in each of the upper sideband and the lower sideband and thereby increase a capacity of the optical super-channel.

18. The optical signal generator according to claim 17, wherein the data transmission path includes an optical fibre link.

* * * * *